United States Patent
McCallion et al.

(10) Patent No.: US 7,502,532 B2
(45) Date of Patent: *Mar. 10, 2009

(54) MULTI-RING RESONATOR IMPLEMENTATION OF OPTICAL SPECTRUM RESHAPER FOR CHIRP MANAGED LASER TECHNOLOGY

(75) Inventors: Kevin McCallion, Charlestown, MA (US); Parviz Tayebati, Weston, MA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/702,436

(22) Filed: Feb. 5, 2007

(65) Prior Publication Data

US 2008/0002990 A1    Jan. 3, 2008

Related U.S. Application Data

(63) Continuation of application No. 11/015,591, filed on Dec. 17, 2004, now Pat. No. 7,280,721, and a continuation-in-part of application No. 10/933,081, filed on Sep. 2, 2004, now Pat. No. 7,406,267, and a continuation-in-part of application No. 10/680,607, filed on Oct. 6, 2003, now Pat. No. 7,054,538, and a continuation-in-part of application No. 10/308,522, filed on Dec. 3, 2002, which is a continuation-in-part of application No. 10/289,944, filed on Nov. 6, 2002, now Pat. No. 6,963,685.

(60) Provisional application No. 60/530,479, filed on Dec. 17, 2003, provisional application No. 60/548,230, filed on Feb. 27, 2004, provisional application No. 60/569,769, filed on May 10, 2004, provisional application No. 60/629,741, filed on Nov. 19, 2004.

(51) Int. Cl.
    *G02B 6/26*    (2006.01)

(52) U.S. Cl. .................................... 385/27; 398/187

(58) Field of Classification Search .................. 385/27; 398/187

See application file for complete search history.

(56) References Cited

U.S. PATENT DOCUMENTS 3,324,295 A    6/1967    Harris (Continued)

FOREIGN PATENT DOCUMENTS

GB    2 107 147    4/1983

(Continued)

OTHER PUBLICATIONS

Alexander et al., Passive Equalization of Semiconductor Diode Laser Frequency Modulation, Journal of Lightwave Technology, Jan. 1989, 11-23, vol. 7, No. 1.

(Continued)

*Primary Examiner*—Ellen Kim
(74) *Attorney, Agent, or Firm*—Workman Nydegger

(57) ABSTRACT

There is provided a fiber optic transmission system, comprising:
  an optical signal source adapted to produce a frequency modulated signal; and
  a multi-ring resonator optical spectrum reshaper (OSR) adapted to convert the frequency modulated signal into a substantially amplitude modulated signal.

And there is provided a method for transmitting an optical signal through a fiber comprising:
  producing a frequency modulated signal;
  passing the frequency modulated signal through a multi-ring resonator optical spectrum reshaper (OSR) so as to convert the frequency modulated signal into a substantially amplitude modulated signal; and
  passing the substantially amplitude modulated signal into the fiber.

17 Claims, 4 Drawing Sheets

Spectral discriminator implemented in ring resonator geometry

U.S. PATENT DOCUMENTS

| | | | |
|---|---|---|---|
| 3,999,105 A | 12/1976 | Archey et al. | |
| 4,038,600 A | 7/1977 | Thomas et al. | |
| 4,561,119 A | 12/1985 | Epworth | |
| 4,805,235 A | 2/1989 | Henmi | |
| 4,841,519 A | 6/1989 | Nishio | |
| 5,293,545 A | 3/1994 | Huber | |
| 5,325,378 A | 6/1994 | Zorabedian | |
| 5,371,625 A | 12/1994 | Wedding et al. | |
| 5,412,474 A | 5/1995 | Reasenberg et al. | |
| 5,416,629 A | 5/1995 | Huber | |
| 5,465,264 A | 11/1995 | Buhler et al. | |
| 5,477,368 A | 12/1995 | Eskildsen et al. | |
| 5,550,667 A | 8/1996 | Krimmel et al. | |
| 5,592,327 A | 1/1997 | Gabl et al. | |
| 5,737,104 A | 4/1998 | Lee et al. | |
| 5,777,773 A | 7/1998 | Epworth et al. | |
| 5,805,235 A | 9/1998 | Bedard | |
| 5,856,980 A | 1/1999 | Doyle et al. | |
| 5,920,416 A | 7/1999 | Beylat et al. | |
| 5,953,139 A | 9/1999 | Nemecek et al. | |
| 5,953,361 A | 9/1999 | Borchert et al. | |
| 5,974,209 A | 10/1999 | Cho et al. | |
| 6,081,361 A | 6/2000 | Adams et al. | |
| 6,096,496 A | 8/2000 | Frankel | |
| 6,104,851 A | 8/2000 | Mahgerefteh | |
| 6,115,403 A | 9/2000 | Brenner et al. | |
| 6,222,861 B1 | 4/2001 | Kuo et al. | |
| 6,271,959 B1 | 8/2001 | Kim et al. | |
| 6,298,186 B1 | 10/2001 | He | |
| 6,331,991 B1 | 12/2001 | Mahgerefteh | |
| 6,353,623 B1 | 3/2002 | Munks et al. | |
| 6,359,716 B1 | 3/2002 | Taylor | |
| 6,421,151 B1 | 7/2002 | Berger et al. | |
| 6,473,214 B1 | 10/2002 | Roberts et al. | |
| 6,506,342 B1 | 1/2003 | Frankel | |
| 6,563,623 B1 | 5/2003 | Penninckx et al. | |
| 6,577,013 B1 | 6/2003 | Glenn et al. | |
| 6,618,513 B2 | 9/2003 | Evankow, Jr. | |
| 6,650,667 B2 | 11/2003 | Nasu et al. | |
| 6,654,564 B1 | 11/2003 | Colbourne et al. | |
| 6,658,031 B2 | 12/2003 | Tuganov et al. | |
| 6,665,351 B2 | 12/2003 | Hedberg et al. | |
| 6,687,278 B1 | 2/2004 | Mason et al. | |
| 6,748,133 B2 | 6/2004 | Liu et al. | |
| 6,778,307 B2 | 8/2004 | Clark | |
| 6,810,047 B2 | 10/2004 | Oh et al. | |
| 6,834,134 B2 | 12/2004 | Brennan et al. | |
| 6,836,487 B1 | 12/2004 | Farmer et al. | |
| 6,847,758 B1 | 1/2005 | Watanabe | |
| 6,943,951 B2 | 9/2005 | Kikuchi et al. | |
| 6,947,206 B2 | 9/2005 | Tsadka et al. | |
| 6,963,685 B2 * | 11/2005 | Mahgerefteh et al. | 385/37 |
| 7,013,090 B2 | 3/2006 | Adachi et al. | |
| 7,054,538 B2 | 5/2006 | Mahgerefteh et al. | |
| 7,076,170 B2 | 7/2006 | Choa | |
| 7,123,846 B2 | 10/2006 | Tateyama et al. | |
| 7,164,865 B2 | 1/2007 | Tatsuno et al. | |
| 7,263,291 B2 | 8/2007 | Mahgerefteh et al. | |
| 7,280,721 B2 * | 10/2007 | McCallion et al. | 385/37 |
| 2002/0044738 A1 | 4/2002 | Jablonski et al. | |
| 2002/0063930 A1 | 5/2002 | Blauvelt | |
| 2002/0154372 A1 | 10/2002 | Chung et al. | |
| 2002/0159490 A1 | 10/2002 | Karwacki | |
| 2002/0176659 A1 | 11/2002 | Lei et al. | |
| 2003/0002099 A1 * | 1/2003 | Sayyah et al. | 359/124 |
| 2003/0002120 A1 | 1/2003 | Choa | |
| 2003/0067952 A1 | 4/2003 | Tsukiji et al. | |
| 2003/0099018 A1 | 5/2003 | Singh et al. | |
| 2003/0147114 A1 | 8/2003 | Kang et al. | |
| 2003/0193974 A1 | 10/2003 | Frankel et al. | |
| 2003/0210912 A1 | 11/2003 | Leuthold et al. | |
| 2004/0008933 A1 | 1/2004 | Mahgerefteh et al. | |
| 2004/0008937 A1 | 1/2004 | Mahgerefteh et al. | |
| 2004/0036943 A1 | 2/2004 | Freund et al. | |
| 2004/0076199 A1 | 4/2004 | Wipiejewski et al. | |
| 2004/0081386 A1 * | 4/2004 | Morse et al. | 385/15 |
| 2004/0096221 A1 | 5/2004 | Mahgerefteh et al. | |
| 2004/0218890 A1 | 11/2004 | Mahgerefteh et al. | |
| 2005/0100345 A1 | 5/2005 | Welch et al. | |
| 2005/0111852 A1 | 5/2005 | Mahgerefteh et al. | |
| 2005/0175356 A1 | 8/2005 | McCallion et al. | |
| 2005/0206989 A1 | 9/2005 | Marsh | |
| 2005/0271394 A1 | 12/2005 | Whiteaway et al. | |
| 2005/0286829 A1 | 12/2005 | Mahgerefteh et al. | |
| 2006/0002718 A1 | 1/2006 | Matsui et al. | |
| 2006/0008272 A1 * | 1/2006 | Abeles et al. | 398/48 |
| 2006/0018666 A1 | 1/2006 | Matsui et al. | |
| 2006/0029358 A1 | 2/2006 | Mahgerefteh et al. | |
| 2006/0029396 A1 | 2/2006 | Mahgerefteh et al. | |
| 2006/0029397 A1 | 2/2006 | Mahgerefteh et al. | |
| 2006/0193636 A1 * | 8/2006 | Katagiri et al. | 398/140 |
| 2006/0228120 A9 | 10/2006 | McCallion et al. | |
| 2006/0233556 A1 | 10/2006 | Mahgerefteh et al. | |
| 2006/0274993 A1 | 12/2006 | Mahgerefteh et al. | |

FOREIGN PATENT DOCUMENTS

| | | |
|---|---|---|
| JP | 62-189832 | 8/1987 |
| JP | 11-031859 | 2/1999 |
| JP | 2000-105313 | 4/2000 |
| JP | 2001-291928 | 10/2001 |
| JP | 2001-320328 | 11/2001 |
| JP | 2002-243935 | 8/2002 |
| JP | 2002-267834 | 9/2002 |
| JP | 2002-267998 | 9/2002 |
| WO | 9905804 | 2/1999 |
| WO | 0104999 | 1/2001 |
| WO | 0117076 A2 | 3/2001 |
| WO | 0118919 A1 | 3/2001 |
| WO | 03005512 | 1/2003 |

OTHER PUBLICATIONS

Binder, J. et al., 10 Gbit/s-Dispersion Optimized Transmission at 1.55 um Wavelength on Standard Single Mode Fiber, IEEE Photonics Technology Letters, Apr. 1994, 558-560, vol. 6, No. 4.

Corvini, P.J. et al., Computer Simulation of High-Bit-Rate Optical Fiber Transmission Using Single-Frequency Lasers, Journal of Lightwave Technology, Nov. 1987, 1591-1596, vol. LT-5, No. 11.

Hyryniewicz, J.V., et al., Higher Order Filter Response in Coupled MicroRing Resonators, IEEE Photonics Technology Letters, Mar. 2000, 320-322, vol. 12, No. 3.

Koch, T. L. et al., Nature of Wavelength Chirping in Directly Modulated Semiconductor Lasers, Electronics Letters, Dec. 6, 1984, 1038-1039, vol. 20, No. 25/26.

Kurtzke, C., et al., Impact of Residual Amplitude Modulation on the Performance of Dispersion-Supported and Dispersion-Mediated Nonlinearity-Enhanced Transmission, Electronics Letters, Jun. 9, 1994, 988, vol. 30, No. 12.

Lee, Chang-Hee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.

Li, Yuan P., et al., Chapter 8: Silicon Optical Bench Waveguide Technology, Optical Fiber Communications, 1997, 319-370, vol. 111B, Lucent Technologies, New York.

Little, Brent E., Advances in MicroRing Resonators, Integrated Photonics Research Conference 2003.

Mohrdiek, S. et al., 10-Gb/s Standard Fiber Transmission Using Directly Modulated 1.55-um Quantum-Well DFB Lasers, IEEE Photonics Technology Letters, Nov. 1995, 1357-1359, vol. 7, No. 11.

Morton, P.A. et al. "38.5km error free transmission at 10Gbit/s in standard fibre using a low chirp, spectrally filtered, directly modulated 1.55um DFB laser", Electronics Letters, Feb. 13, 1997, vol. 33(4).

Prokais, John G., Digital Communications, 2001, 202-207, Fourth Edition, McGraw Hill, New York.

Rasmussen, C.J., et al., Optimum Amplitude and Frequency-Modulation in an Optical Communication System Based on Dispersion Supported Transmission, Electronics Letters, Apr. 27, 1995, 746, vol. 31, No. 9.

Shalom, Hamutal et al., On the Various Time Constants of Wavelength Changes of a DFB Laser Under Direct Modulation, IEEE Journal of Quantum Electronics, Oct. 1998, pp. 1816-1822, vol. 34, No. 10.

Wedding, B., Analysis of fibre transfer function and determination of receiver frequency response for dispersion supported transmission, Electronics Letters, Jan. 6, 1994, 58-59, vol. 30, No. 1.

Wedding, B., et al., 10-Gb/s Optical Transmission up to 253 km Via Standard Single-Mode Fiber Using the Method of Dispersion-Supported Transmission, Journal of Lightwave Technology, Oct. 1994, 1720, vol. 12, No. 10.

Yu, et al., Optimization of the Frequency Response of a Semiconductor Optical Amplifier Wavelength Converter Using a Fiber Bragg Grating, Journal of Lightwave Technology, Feb. 1999, 308-315, vol. 17, No. 2.

Matsui, Yasuhiro et al, Chirp-Managed Directly Modulated Laser (CML), IEEE Photonics Technology Letters, Jan. 15, 2006, pp. 385-387, vol. 18, No. 2.

Nakahara, K. et al, 40-Gb/s Direct Modulation With High Extinction Ratio Operation of 1.3-µm InGaAlAs Multiquantum Well Ridge Waveguide Distributed Feedback Lasers, IEEE Photonics Technology Letters, Oct. 1, 2007, pp. 1436-1438, vol. 19 No. 19.

Sato, K. et al, Chirp Characteristics of 40-Gb/s Directly Modulated Distributed-Feedback Laser Diodes, Journal of Lightwave Technology, Nov. 2005, pp. 3790-3797, vol. 23, No. 11.

* cited by examiner

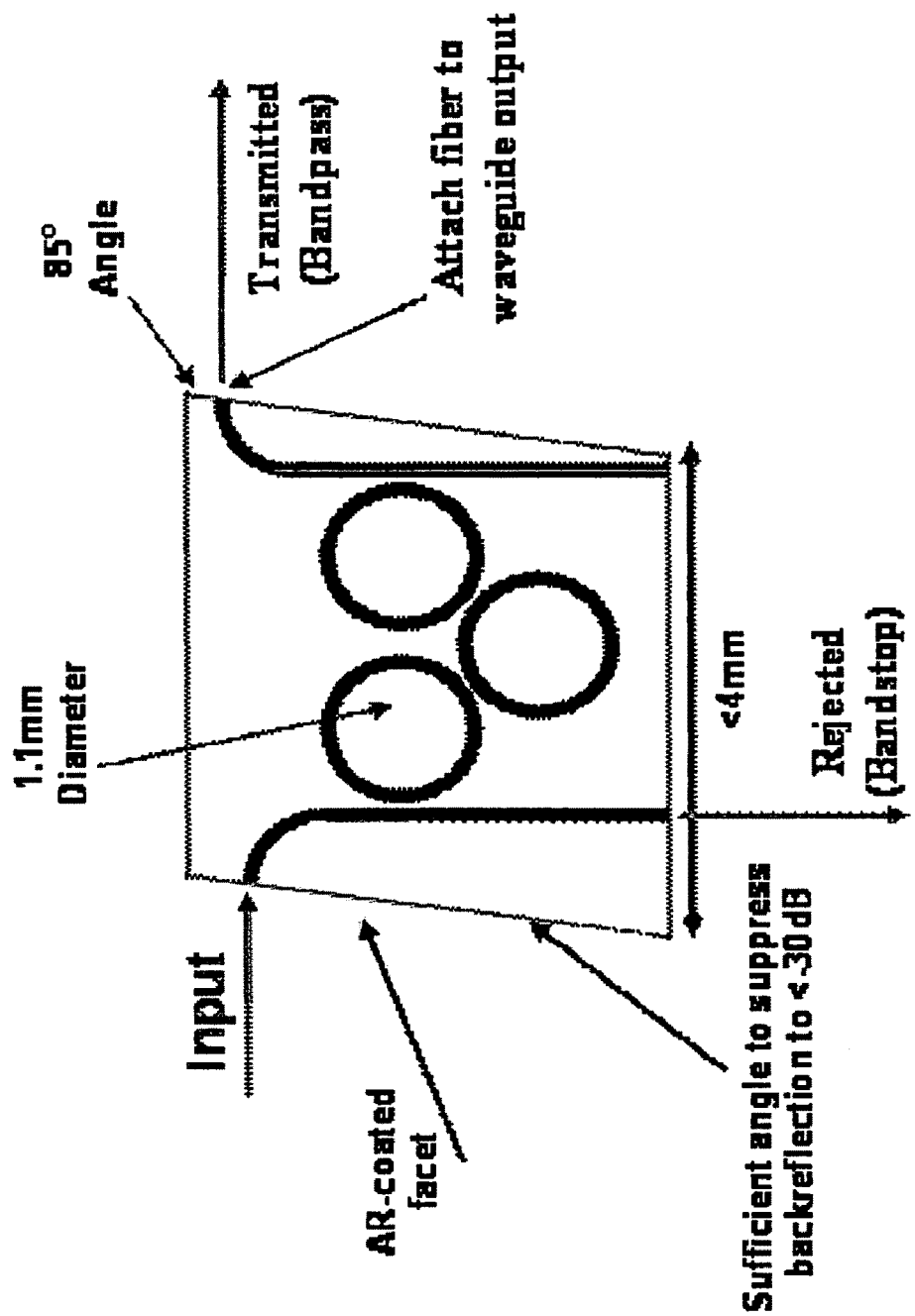
Figure 2: Spectral discriminator implemented in ring resonator geometry

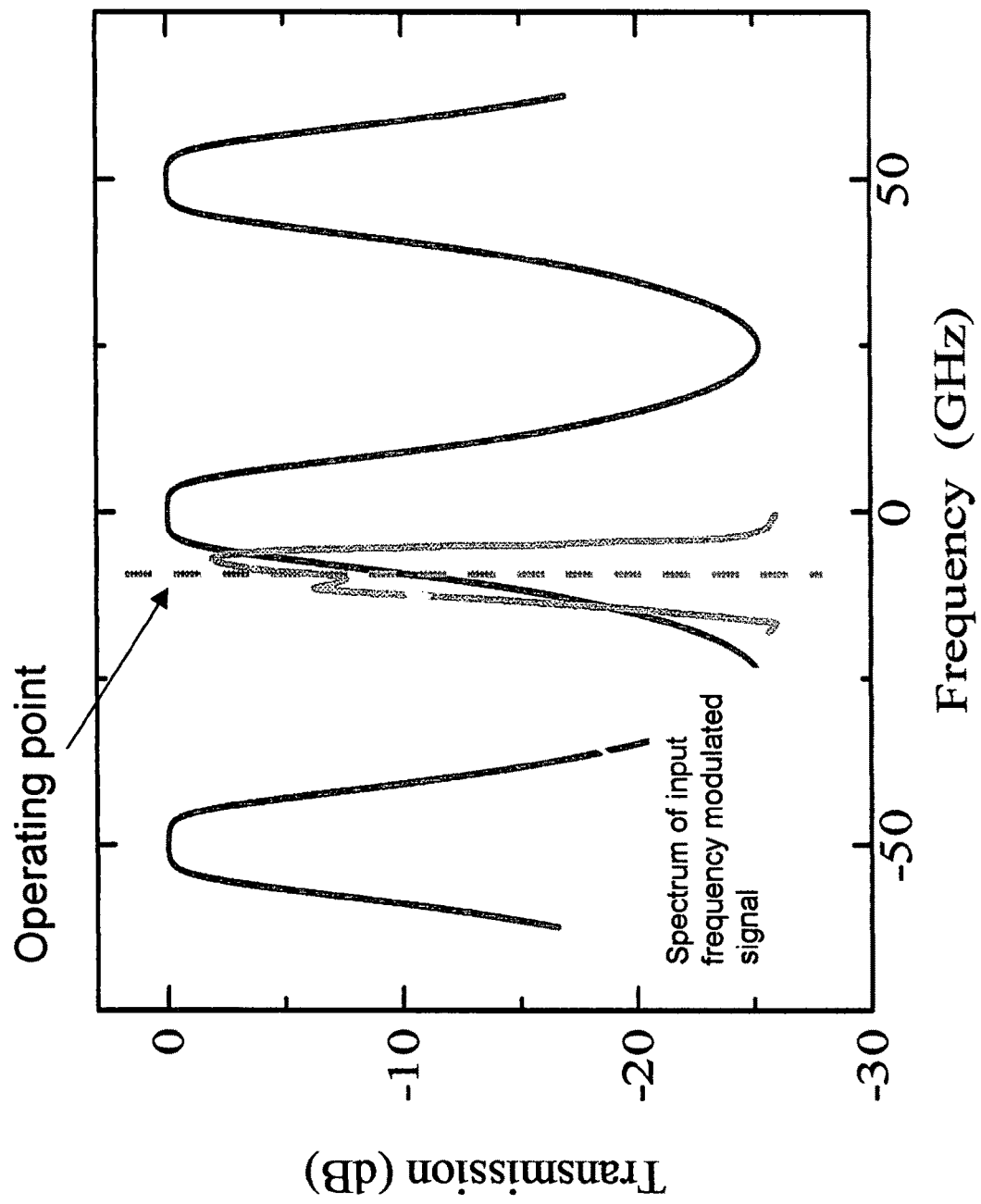
Figure 3: Typical spectral response from 3-ring resonator geometry

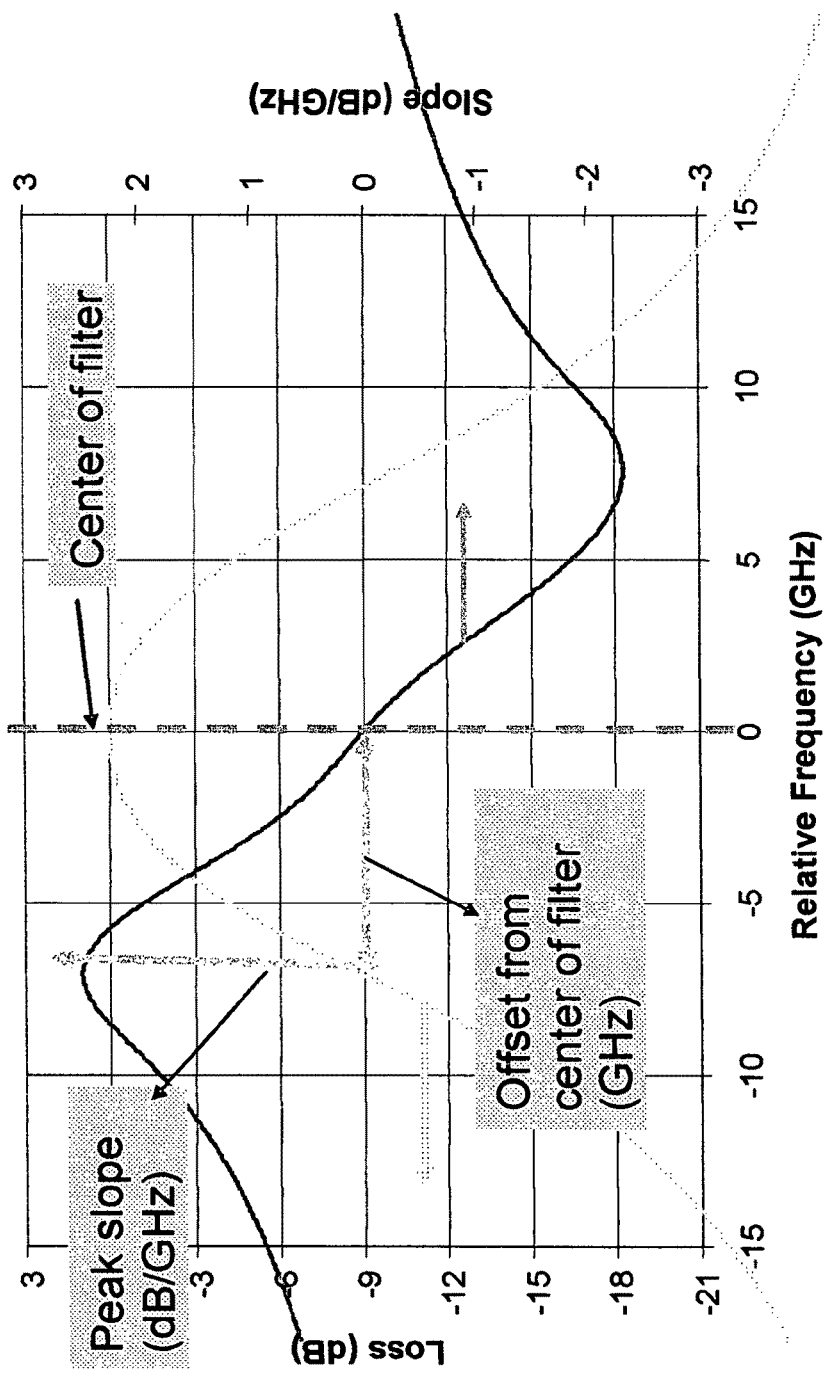
Figure 4: Definitions of peak slope

US 7,502,532 B2

MULTI-RING RESONATOR IMPLEMENTATION OF OPTICAL SPECTRUM RESHAPER FOR CHIRP MANAGED LASER TECHNOLOGY

REFERENCE TO PENDING PRIOR PATENT APPLICATIONS

This patent application is a continuation of prior U.S. patent application Ser. No. 11/015,591, filed Dec 17, 2004 now U.S. Pat. No. 7,280,721 by Kevin McCallion et al. for MULTI-RING RESONATOR IMPLEMENTATION OF OPTICAL SPECTRUM RESHAPER FOR CHIRP MANAGED LASER TECHNOLOGY which, in turn, is:

(i) a continuation-in-part of prior U.S. patent application Ser. No. 10/289,944, filed Nov. 6, 2002 now U.S. Pat. No. 6,963,685 by Daniel Mahgerefteh et al. for POWER SOURCE FOR A DISPERSION COMPENSATION FIBER OPTIC SYSTEM;

(ii) a continuation-in-part of pending prior U.S. patent application Ser. No. 10/308,522, filed Dec. 3, 2002 by Daniel Mahgerefteh et al. for HIGH-SPEED TRANSMISSION SYSTEM COMPRISING A COUPLED MULTI-CAVITY OPTICAL DISCRIMINATOR;

(iii) a continuation-in-part of prior U.S. patent application Ser. No. 10/680,607, filed Oct. 6, 2003 now U.S. Pat. No. 7,054,538 by Daniel Mahgerefteh et al. for FLAT DISPERSION FREQUENCY DISCRIMINATOR (FDFD);

(iv) a continuation-in-part of prior U.S. patent application Ser. No. 10/933,081, filed Sep. 2, 2004 now U.S. Pat. No. 7,406,267 by Daniel Mahgerefteh et al. for METHOD AND APPARATUS FOR TRANSMITTING A SIGNAL USING THERMAL CHIRP MANAGEMENT OF A DIRECTLY MODULATED TRANSMITTER;

(v) claims benefit of prior U.S. Provisional patent application Ser. No. 60/530,479, filed Dec. 17, 2003 by Daniel Mahgerefteh et al. for OPTICAL TELECOMMUNICATION SYSTEM;

(vi) claims benefit of prior U.S. Provisional patent application Ser. No. 60/548,230, filed Feb. 27, 2004 by Yasuhiro Matsui et al. for OPTICAL SYSTEM COMPRISING AN FM SOURCE AND A SPECTRAL RESHAPING ELEMENT;

(vii) claims benefit of prior U.S. Provisional patent application Ser. No. 60/569,769, filed May 10, 2004 by Daniel Mahgerefteh et al. for FLAT CHIRP INDUCED BY AN OPTICAL FILTER EDGE; and (viii) claims benefit of prior U.S. Provisional patent application Ser. No. 60/629,741, filed Nov. 19, 2004 by Yasuhiro Matsui et al. for OPTICAL SYSTEM COMPRISING AN FM SOURCE AND A SPECTRAL RESHAPING ELEMENT.

The above-identified patent applications are hereby incorporated herein by reference.

FIELD OF THE INVENTION

This invention relates to signal transmissions in general, and more particularly to the transmission of optical signals.

BACKGROUND OF THE INVENTION

A system for long-reach lightwave data transmission through optical fiber is disclosed in U.S. patent application Ser. No. 10/289,944, filed Nov. 6, 2002 by Daniel Mahgerefteh et al. for POWER SOURCE FOR A DISPERSION COMPENSATION FIBER OPTIC SYSTEM (Attorney's Docket No. TAYE-59474-00006), which patent application is hereby incorporated herein by reference. Azna LLC of Wilmington, Mass. sometimes refers to the transmitter apparatus of this patent application as a Chirp Managed Laser (CML™). In this system, a frequency modulated (FM) source is followed by an optical discriminator, also sometimes referred to as optical spectrum reshaper (OSR), which converts frequency modulation into a substantially amplitude modulated (AM) signal and partially compensates for the dispersion in the transmission fiber.

The optical spectrum reshaper (OSR) can be formed by any optical element that has a wavelength-dependent transmission function. The OSR can be adapted to convert frequency modulation to amplitude modulation. Significantly, the OSR can also be adapted to convert amplitude modulation to frequency modulation. The means and advantages of converting amplitude modulation to frequency modulation with an OSR has been described U.S. Provisional Patent Application Ser. No. 60/569,769, filed May 10, 2004 by Daniel Mahgerefteh et al. for FLAT CHIRP INDUCED BY AN OPTICAL FILTER EDGE which patent application is hereby incorporated herein by reference.

The phase imparted by the OSR may also be used to compensate for at least a portion of the dispersion of the transmission fiber, as disclosed in U.S. patent application Ser. No. 10/289,944, filed Nov. 6, 1962 by Daniel Mahgerefteh et al. for POWER SOURCE FOR A DISPERSION COMPENSATION FIBER OPTIC SYSTEM.

A variety of optical spectrum reshapers (OSRs), sometimes referred to as optical discriminators in one or more of the above-identified patent applications, are disclosed in the aforementioned U.S. patent application Ser. No. 10/289,944.

Semiconductor material growth make it possible to integrate various optical components, leading to the smaller size, ease of mass production and low manufacturing cost that the electronics industry now enjoys. This is one goal of planar light wave technology, which seeks to replace bulk optical elements used in a transmitter, for example, by waveguide-based devices.

It is, therefore, an object of the present invention to make a CML™ laser source which can be integrated. The CML™ laser source comprises a frequency modulated source such as a distributed feedback laser chip (DFB) and an OSR.

SUMMARY OF THE INVENTION

These and other objects of the present invention are addressed by a novel multi-ring resonator implementation of optical spectrum reshaper for chirp managed laser technology.

In one form of the invention, there is provided a fiber optic transmission system, comprising:

an optical signal source adapted to produce a frequency modulated signal; and a multi-ring resonator optical spectrum reshaper (OSR) adapted to convert the frequency modulated signal into a substantially amplitude modulated signal.

In another form of the invention, there is provided a method for transmitting an optical signal through a fiber comprising:

producing a frequency modulated signal;

passing the frequency modulated signal through a multi-ring resonator optical spectrum reshaper (OSR) so as to convert the frequency modulated signal into a substantially amplitude modulated signal; and passing the substantially amplitude modulated signal into the fiber.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts and further wherein:

FIG. 2 shows a multi-ring resonator geometry which may be used for an optical spectrum reshaper (OSR);

FIG. 3 shows typical spectral response from a 3-ring resonator configuration; and FIG. 4 defines the peak slope of the transmission profile for the optical spectrum reshaper (OSR).

DETAILED DESCRIPTION OF THE PREFERRED EMBODIMENTS

Figure 1:
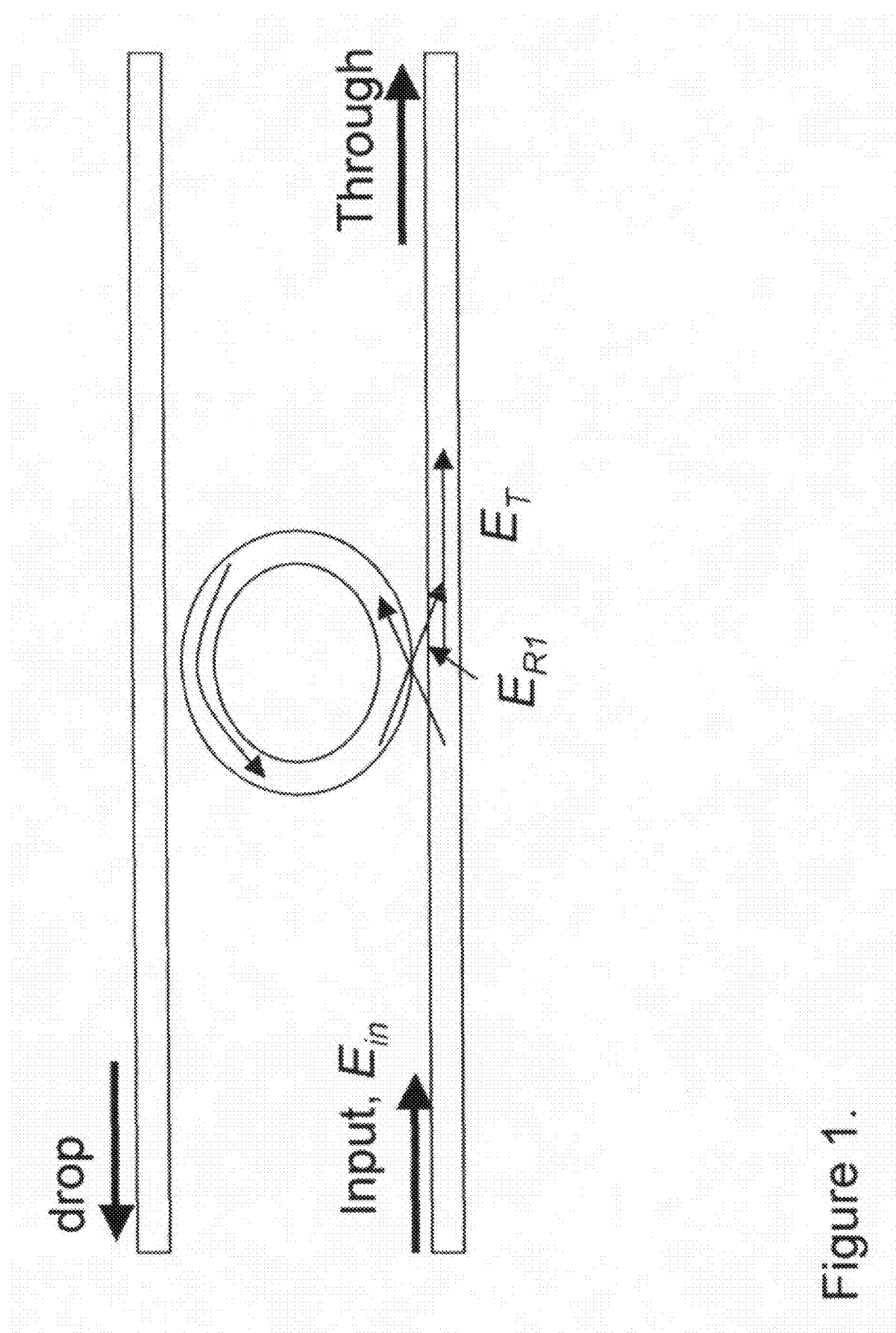
FIG. 1 is schematic diagram showing a micro-ring resonator coupled to straight waveguide sections.

In accordance with the present invention, the spectral characteristics of the OSR can be achieved using coupled micro-ring resonators, which are waveguide devices capable of being integrated. The micro-ring resonators generally comprise small (e.g., 4-25 μm radii) waveguide rings that are coupled to straight waveguide sections, as shown in FIG. 1.

A single ring resonator has a wavelength dependent transmission profile similar to a Fabry-Perot filter, or a single cavity etalon.

The micro-ring resonator functions as follows.

Input to the straight section $E_{in}$ couples partly into the micro-ring, while a fraction, $E_T$, passes to the straight section on the other side of the micro-ring. Light coupled into the micro-ring, $E_{R1}$, travels around the ring and couples back into the straight section, having picked up a phase according to $\eta E_R \exp(i\phi)$. Here $\eta$ is a fraction depending on the coupling and the loss, and $\phi$ is the phase shift caused by traveling around the ring. With each round trip around the micro-ring, part of the light is phase shifted and added to the through field, generating fields $E_{R2}$, $E_{R3}$, . . . . The output electric field at the end of the straight section is the interference between the through field $E_T$ and the multiplicity of waves, $E_{R1}$, $E_{R2}$, $E_{R3}$, . . . that have traveled 1, 2, 3, . . . n times around the micro-ring. When the interference is constructive, the output field has a peak in its transmission spectrum. The phase difference is determined by the size and effective refractive index of the micro-ring. The part of the optical signal which is not transmitted at the "through port" is rejected at the "drop port" of the micro-ring resonator apparatus.

A micro-ring resonator with multiple micro-rings can have a transmission profile that is similar to a multi-cavity filter, as described in U.S. patent application Ser. No. 10/308,522, filed Dec. 3, 2002 by Daniel Mahgerefteh et al. for HIGH-SPEED TRANSMISSION SYSTEM COMPRISING A COUPLED MULTI-CAVITY OPTICAL SCANNER, which patent application is hereby incorporated herein by reference.

Significantly, the bandwidth and slope of the transmission profile of the multi-ring cavity OSR can be designed by choosing the number, radius, and coupling coefficient of the micro-rings. Recent technical developments have shown that coupled ring resonators can be implemented in integrated optics form using both dielectric-based (i.e., glass-based) and semiconductor-based material systems, as described, for example, by J. V. Hryniewicz et al., *IEEE Photonics Technology Letters*, vol. 12, No. 3, p. 320 (2000), which publication is hereby incorporated herein by reference. Furthermore, ring resonator geometries have been demonstrated using both planar and vertical coupling schemes. For example, a 3-ring resonator, flat-topped, wavelength division multiplexed (WDM) ring resonator device was demonstrated by Little Optics (*Advances in Microring Resonators*, Brent E. Little, LittleOptics, Inc, Integrated Photonics Research Conference, 2003), which publication is hereby incorporated herein by reference. Similar spectral responses have been demonstrated for ring resonator architectures implemented in a variety of material systems including Silicon, InP, GaAs, glass, Silica, etc.

FIG. 2 shows a preferred implementation of a multi-ring resonator geometry that may be used for CML™ technology. The material system has a refractive index close to n=1.6, such that a ring diameter of 1.1 mm results in a periodicity of 50 GHz. The optical length of the ring is tailored to produce a periodicity of 50 GHz so as to allow the spectral response to be used for wavelength locking to the 50 GHz-spaced ITU grid, which is the common telecommunications standard, and also so as to allow the implementation of a tunable version of the CML™ system. The couplings between the input and output waveguides and the rings, and the couplings between adjacent waveguide rings, can be controlled to produce the desired spectral response.

FIG. 3 is a graph plotting transmission as a function of optical frequency for the OSR which may be formed by the multi-ring resonator. In a preferred embodiment of the present invention, shown in FIG. 3, the operating point of the input frequency modulated signal is at the edge of the transmission peak of the OSR. Note that in the standard usage of the multi-ring filter, the input wavelength is centered on the transmission peak of the multi-ring resonator so as to reduce loss. In the CML™ application of the present invention, the edge of the transmission is used to convert the frequency modulated signal to a substantially amplitude modulated signal. The transmission edge of the multi-ring resonator can also be adapted to convert amplitude modulation to appropriate frequency modulation so as to generate flat chirp and thereby increase the transmission distance of the resulting output signal in fiber with dispersion, as described in U.S. Provisional Patent Application Ser. No. 60/569,769, filed May 10, 2004 by Daniel Mahgerefteh et al. for FLAT CHIRP INDUCED BY AN OPTICAL FILTER EDGE, which patent application is hereby incorporated herein by reference.

FIG. 4 defines the peak slope of the transmission profile for the OSR. The peak slope of the transmission peak of the ring resonator OSR is preferably in the range of about 2 dB/GHz to about 3 dB/GHz for a system having a 10 Gb/s bit rate of operation. The bandwidth of the ring resonator filter is preferably about 0.8 times to about 1.2 times the bit rate of operation.

In an embodiment of the present invention, the design parameters of the multi-ring resonator, such as coupling and ring radii, can be varied so as to create a transmission profile which is substantially Gaussian. As described in U.S. patent application Ser. No. 10/680,607, filed Oct. 6, 2003 by Daniel Mahgerefteh et al. for FLAT DISPERSION FREQUENCY DISCRIMINATOR (FDFD), which patent application is hereby incorporated herein by reference, a substantially Gaussian shape can be beneficial. In another embodiment of the present invention, the spectral shape is made to be nearly flat-topped for a low bit rate (e.g., 2.5 Gb/s) application, with a slope near the top of the filter of <0.2 dB/GHz.

The aforementioned CML™ technology can be applied at a 10 Gb/s transmission bit rate to distances of greater than 200 km of standard single mode fiber having a net dispersion of 3200 ps/nm, as described in U.S. Provisional Patent Application Ser. No. 60/548,230, filed Feb. 27, 2004 by Yasuhiro Matsui et al. for OPTICAL SYSTEM COMPRISING AN FM SOURCE AND A SPECTRAL RESHAPING ELEMENT, which patent application is hereby incorporated herein by reference. In this case, the requirements for the multi-ring resonator OSR transmission is different, as disclosed in U.S. Provisional Patent Application Ser. No. 60/629,741, filed Nov. 19, 2004 by Yasuhiro Matsui et al. for OPTICAL SYSTEM COMPRISING AN FM SOURCE AND A SPECTRAL RESHAPING ELEMENT. More particularly, in this case, a key parameter of the OSR is the slope of its logarithmic slope, defined as the ratio of the peak slope in dB/GHz to the frequency offset of the peak slope from the transmission peak in GHz, as shown in FIG. 4. For example, for a 10 Gb/s transmitter, a low bit error rate after transmission is obtained if the slope of the slope is approximately in the range of 0.38 $dB/GHz^2$ to 0.6 $dB/GHz^2$. In addition, the slope of the OSR near the center of the transmission should be approximately linear. Deviations from linearity introduce distortions in the resulting output eye diagram and increased bit error rate. A linear slope corresponds to a round-topped shaped filter. So, for example, a flat-top filter, which has a near zero slope near the center, is generally not desirable for this long reach application. The 3 dB bandwidth of the bandpass OSR should be in the range of 65% to 90% of the bit rate for this long reach application.

A wavelength locking circuit for the CML™ system is described in U.S. patent application Ser. No. 10/680,607, filed Oct. 6, 2003 by Daniel Mahgerefteh et al. for FLAT DISPERSION FREQUENCY DISCRIMINATOR (FDFD) (Attorney's Docket No. TAYE-59474-00009), which patent application is hereby incorporated herein by reference. In this arrangement, the optical power of the source, $P_S$, and optical power transmitted through the spectrum reshaper, $P_T$, are measured using taps and the ratio $P_T/P_S$ held constant. In an embodiment of the present invention, a tap splitter on the input of the straight section couples part of the input light so as to measure input power, $P_S$, and a second tap at the output waveguide can be added to couple part of the output power and measure $P_T$. Photodiodes placed to receive the outputs of the two taps, respectively, are then used as part of the wavelength locking circuit such as that described in the aforementioned U.S. patent application Ser. No. 10/680,607. The wavelength of the source is kept locked to the transmission edge of the multi-ring resonator by adjusting the wavelength of the source in order to keep the ratio $P_T/P_S$ constant.

In one preferred implementation, the multi-ring resonator geometry is integrated with the source, to gain the benefit of wafer level fabrication whereby to obtain lower chip costs and increase yield. A key advantage of the multi-ring resonator in the CML™ application is that the rejected light does not reflect back into the source, thus eliminating the need for an optical isolator. This makes it possible to integrate the source, such as a distributed feedback laser (DFB) with the multi-ring resonator OSR. Further advantages of an integrated version of the optical discriminator include small size, fast thermal response time and higher wavelength sensitivity (for semiconductor-based implementations). In particular, the possibility of integrating the discriminator function together with the DFB laser on a common chip exists if InP is used as the material system. In this case, the relative spectral positions of the discriminator and the laser wavelength can track with temperature and allow a simple control algorithm to be used. It is, therefore, an embodiment of the present invention to integrate a frequency modulated source, such as a DFB laser, with the multi-ring cavity OSR.

In another embodiment of the present invention, a DFB array (comprising a plurality of DFB lasers, each having a different wavelength of operation) is integrated on the same chip with a plurality of multi-ring resonators so as to form a multi-wavelength CML™ source. These separate wavelengths are then combined by another multiplexer multi-ring resonator.

It will be appreciated that still further embodiments of the present invention will be apparent to those skilled in the art in view of the present disclosure. It is to be understood that the present invention is by no means limited to the particular constructions herein disclosed and/or shown in the drawings, but also comprises any modifications or equivalents within the scope of the invention.

What is claimed is:

1. A method for transmitting an optical signal through a fiber comprising:
   producing a frequency modulated signal;
   passing the frequency modulated signal through a multi-ring resonator optical spectrum reshaper (OSR) so as to convert the frequency modulated signal into a substantially amplitude modulated signal, the operating point of the frequency modulated signal being near the edge of the transmission peak of the multi-ring resonator OSR; and
   passing the substantially amplitude modulated signal into the fiber.

2. The method of claim 1, wherein producing a frequency modulated signal comprises generating a frequency modulated signal having a bit rate and wherein the multi-ring resonator OSR has a transmission profile having a 3 dB bandwidth approximately equal to from 65% to approximately 90% of the bit rate.

3. The method of claim 1, further comprising:
   measuring a first optical power of the frequency modulated signal input to the multi-ring resonator OSR;
   measuring a second optical power of signals transmitted from the multi-ring resonator OSR to the multi-ring resonator with the optical power of the transmitted signals from multi-ring resonator;
   comparing the first and second optical powers; and
   adjusting the frequency modulated signal to maintain the ratio of the first and second optical powers substantially constant.

4. The method of claim 3, wherein measuring the first optical power comprises receiving at a first photodiode an output of a first tap coupled to an input of the multi-ring resonator OSR; and wherein measuring the second optical power comprises receiving at a second photodiode an output from a second tap coupled to an output through port of the multi-ring resonator OSR.

5. The method of claim 4, wherein the first and second taps are integrated on the same substrate as the multi-ring resonator.

6. The method of claim 3, wherein measuring the first optical power comprises receiving at a first photodiode an output of a first tap coupled to an input of the multi-ring resonator OSR; and wherein measuring the second optical power comprises receiving at a second photodiode an output from a second tap coupled to a drop port of the multi-ring resonator OSR.

7. The method of claim 1, wherein the multi-ring resonator OSR comprises coupled straight sections and ring waveguides.

8. The method of claim 7, wherein the number, the radii of the rings and the coupling between the rings is adjusted to produce a desired transmission profile.

9. The method of claim 1, wherein the multi-ring resonator OSR has a transmission function that is a periodic function with a periodicity equal to an integer multiple of 50 GHz.

10. The method of claim 1, wherein the multi-ring resonator OSR has a transmission function that is substantially Gaussian near each transmission peak.

11. The method of claim 10, wherein the transmission function of the multi-ring resonator OSR is substantially flat-topped near each transmission peak.

12. The method of claim 1, wherein the multi-ring resonator has a transmission function having of a slope of <0.2 dB/GHz near a transmission peak thereof 13. A fiber optic system according to claim 1, wherein the peak slope of the transmission profile is approximately 2 dB/GHz to approximately 3 dB/GHz.

14. The method of claim 1, wherein the multi-ring resonator has a transmission function having a slope of slope of approximately 0.36 dB/GHz$^2$ to approximately 0.6 dB/GHz$^2$.

15. The method of claim 1, wherein producing a frequency modulated signal comprises modulating a distributed feedback (DFB) laser.

16. The method of claim 2, further comprising forming the DFB laser is integrated and the multi-ring resonator OSR on the same substrate.

17. The method of claim 1, wherein producing a frequency modulated signal comprises modulating a distributed feedback (DFB) array.

* * * * *

UNITED STATES PATENT AND TRADEMARK OFFICE
CERTIFICATE OF CORRECTION

PATENT NO. : 7,502,532 B2  
APPLICATION NO. : 11/702436  
DATED : March 10, 2009  
INVENTOR(S) : McCallion et al.

Page 1 of 1

It is certified that error appears in the above-identified patent and that said Letters Patent is hereby corrected as shown below:

Column 2
Line 36, change "make" to --makes--

Column 3
Line 16, change "is schematic" to --is a schematic--

Column 7
Line 17, change "of a slope" to --a slope--

Column 8
Line 5, change "as slope of slope of" to --a slope of--

Signed and Sealed this
Twenty-second Day of February, 2011

David J. Kappos
*Director of the United States Patent and Trademark Office*